(12) United States Patent
Falkenstein

(10) Patent No.: US 8,532,852 B2
(45) Date of Patent: Sep. 10, 2013

(54) CONTROL DEVICE AND METHOD FOR CONTROLLING A HYBRID DRIVE

(75) Inventor: Jens-Werner Falkenstein, Aalen (DE)

(73) Assignee: Robert Bosch GmbH, Stuttgart (DE)

( * ) Notice: Subject to any disclaimer, the term of this patent is extended or adjusted under 35 U.S.C. 154(b) by 953 days.

(21) Appl. No.: 12/304,961

(22) PCT Filed: Jul. 11, 2007

(86) PCT No.: PCT/EP2007/057108
§ 371 (c)(1),
(2), (4) Date: May 29, 2009

(87) PCT Pub. No.: WO2008/022846
PCT Pub. Date: Feb. 28, 2008

(65) Prior Publication Data
US 2010/0042278 A1 Feb. 18, 2010

(30) Foreign Application Priority Data
Aug. 22, 2006 (DE) .......................... 10 2006 039 400

(51) Int. Cl.
*B60W 20/00* (2006.01)
*B60W 10/06* (2006.01)
*B60W 10/08* (2006.01)

(52) U.S. Cl.
USPC .......... 701/22; 701/54; 318/400.15; 318/432; 180/65.265; 180/65.21

(58) Field of Classification Search
USPC ... 701/22, 54; 318/400.15, 432; 180/65.265, 180/65.21; 477/3
See application file for complete search history.

(56) References Cited

U.S. PATENT DOCUMENTS

| 2006/0025906 A1* | 2/2006 | Syed et al. ...................... 701/22 |
| 2007/0012494 A1* | 1/2007 | Ibenthal et al. .............. 180/65.3 |
| 2010/0000812 A1* | 1/2010 | Deuble et al. ........... 180/65.265 |
| 2010/0089064 A1* | 4/2010 | Falkenstein ..................... 60/702 |

FOREIGN PATENT DOCUMENTS

| DE | 10 2004 062 012 | 7/2006 |
| DE | 10 2005 044 828 | 3/2007 |
| EP | 1 743 794 | 1/2007 |
| WO | WO 2006069833 A1 * | 7/2006 |
| WO | WO 2007/074002 | 7/2007 |
| WO | WO 2007074002 A1 * | 7/2007 |
| WO | WO 2006069833 A1 * | 7/2008 |

OTHER PUBLICATIONS

International Search Report, PCT/EP2007/057108 dated Oct. 23, 2007.

* cited by examiner

*Primary Examiner* — Thomas Black
*Assistant Examiner* — Sara Lewandroski
(74) *Attorney, Agent, or Firm* — Kenyon & Kenyon LLP

(57) ABSTRACT

A control device for a hybrid drive, in particular for a hybrid drive of a motor vehicle having at least one combustion engine and at least one electric motor as driving motors, whose torques are coupled together to form a total torque. A controller is provided which generates an actuating signal for controlling the speed of each of the driving motors, a first actuating signal acting on the electric motor having a higher dynamic response than a second actuating signal acting on the combustion engine.

13 Claims, 5 Drawing Sheets

CONTROL DEVICE AND METHOD FOR CONTROLLING A HYBRID DRIVE

FIELD OF THE INVENTION

The present invention relates to a control device for a hybrid drive, in particular for a hybrid drive of a motor vehicle having at least one combustion engine and at least one electric motor as driving motors, whose torques are coupled together to form a total torque.

BACKGROUND INFORMATION

Control devices of the type mentioned at the outset are generally known. In this context, control functions and control algorithms are used which produce manipulated variables for the driving motors from a speed of the hybrid drive and a torque demand, for example. In the case of an open-loop/closed-loop control of the speed of the hybrid drive, the control device must apportion the torque demand between the electric motor and the combustion engine. If the driving motors are controlled in parallel, a torque reserve must remain for each of them to allow a rapid torque build-up and a fast reaction to load changes in response to a torque demand. The torque reserve of the combustion engine is set in the idle condition of an Otto engine, for example, which is operated at lambda=1 (homogeneous operation), by increasing the air supply in conjunction with a retarding of the ignition timing. This type of combustion-engine torque reserve that is rapidly retrievable in response to advancing of the ignition timing at an operating point having a characteristic speed can be utilized for speed control, but is associated with an increased fuel consumption and increased exhaust emissions.

SUMMARY

The control device according to example embodiments of the present invention has a controller which generates an actuating signal for controlling the speed of each of the driving motors, a first actuating signal acting on the electric motor having a higher dynamic response than a second actuating signal acting on the combustion engine. A controller of this kind renders possible a high-quality, hybrid-drive speed control without the need for maintaining a rapidly retrievable torque reserve for the combustion engine. The process of influencing the torques of the driving motors is dynamically apportioned between a first path for controlling the electric motor and a second path for controlling the combustion engine, the first path responding more quickly than the second path. It is intended in this context that the torques of the driving motors (electric motor and combustion engine) complement one another in a practical and useful manner. The first path has the task of responding highly dynamically to speed deviations from a setpoint value—caused, for example, by a disturbance. The second path exhibits a reduced dynamic response to the deviations, but controls the inaccuracies up to a predefined threshold, to a setpoint speed. This apportionment is advantageous since the torque control of a present-day electric motor exhibits a much higher dynamic response than the air supply control of a combustion engine (intake manifold dynamics), for example, of an Otto engine in homogeneous operation.

Example embodiments of the present invention provide for the controller to generate the first actuating signal and the second actuating signal from a comparison between an actual speed and a setpoint speed. For example, the controller ascertains a speed deviation and, on the basis of this deviation, outputs coordinated manipulated variables to the driving motors. An actuator, which converts an actuating signal of the controller, respectively control device, to a manipulated variable of the particular driving motor, is located between the controller and at least one of the driving motors. The speed deviation is determined by forming a difference between the setpoint speed and the actual speed.

It is provided, in particular, that the first actuating signal be non-compensatory, and that the second actuating signal be composed of a compensatory component and of a non-compensatory component. If a speed deviation (system deviation) occurs, the first actuating signal responds highly dynamically to ensure that the speed deviation is counteracted by the electric motor rapidly, but over a short duration. The second actuating signal has a compensatory component which ensures that the combustion engine compensates for the speed deviations within a time frame that is predefined by the dynamic response of the combustion engine and of the controller, so that the speed deviation is lower than a correction threshold to which the controller no longer reacts. Besides the compensatory component, the second actuating signal has a non-compensatory component, which, in fact, has a lower dynamic response that the first actuating signal, but is not able to compensate for the speed deviation.

It is advantageously provided for the controller to be a PI controller and/or a PID controller. These types of standard controllers are able to be readily implemented by electronic components, for example. Their control response is able to be determined from the outset by appropriate simulations. The PI controller (proportional-integral controller) and the PID controller (proportional-integral-differential controller) combine the properties of a rapid response with a complete or nearly complete correction of a system deviation.

In particular, it is provided that an integral component of a control output signal be compensatory and that a proportional component of the control output signal and/or a differential component of the control output signal be non-compensatory. The different components of the PI, respectively PID controllers (proportional component, integral component and differential component) are separated in the controller and output as actuating signals or as components of actuating signals to the driving motors. In this context, the proportional component and the differential component exhibit a high dynamic response, the differential component again being significantly faster than the proportional component. In comparison, the integral component of the control output signal is slower, but it is able to compensate asymptotically for the system deviation that is in the form of a speed deviation.

In addition, it is provided for a frequency duplexer to be connected in outgoing circuit to the controller for separating the proportional component and/or the differential component of the controller output signal into the first actuating signal and the non-compensatory component of the second actuating signal, the first actuating signal having a higher dynamic response than the non-compensatory component of the second actuating signal. The frequency duplexer is composed, for example, of a high-pass filter (high-pass HP) and of a low-pass filter (low-pass LP). The high-pass filter allows the signal components above a limit frequency to pass and suppresses the signal components having a lower frequency than the limit frequency, while the low-pass filter allows the signal components having a lower frequency than the limit frequency to pass and suppresses the signal components having a higher frequency than the limit frequency. The signal components passing through the high-pass filter then exhibit a higher dynamic response than the signal components of the proportional component passing through the low-pass filter.

Example embodiments of the present invention provide for a sampling device for sampling a torque demand which, in response to the torque demand, freezes the compensatory component to its instantaneous value and limits the non-compensatory component to the magnitude of the compensatory component with a negative sign. This measure allows the control device to effect a smooth transition from a speed-controlled operation of the driving motors to a torque-controlled operation of the hybrid drive, in response to a torque demand, for example upon actuation of an accelerator pedal. In response to a torque demand, the compensatory components of the second actuating signal are not able to respond, since it is frozen to its value at the moment of the torque demand. The non-compensatory component is able to maximally compensate for the frozen compensatory component, so that, given a high enough actual speed, the controller does not respond to the torque demand by applying a speed correction. Therefore, in response to a torque demand, the speed control is suppressed (cut out).

In particular, it is provided that the controller be apportioned between a first control unit of the electric motor and a second control unit of the combustion engine, the first actuating signal being generated by a speed comparison in the first control unit and the second actuating signal by a speed comparison in the second control unit. Present-day control units function in accordance with the sampling control principle based on a time-synchronous or torque-synchronous calculation cycle of the control algorithms. For the most part, the calculation cycle of the first control unit and of the second control unit are not mutually synchronized. The communication among the control units is effected over a bus system, resulting in a time delay during the data exchange. This time delay negatively affects the control quality. To overcome this disadvantage, the rapidly changing actual speed in the first control unit and in the second control unit are each determined separately and compared to the setpoint speed. To that end, the actual speed may be determined in each case at the electric motor, respectively at the combustion engine.

In addition, a torque control is provided which controls one of the two driving motors as a function of a difference between a desired torque and a precontrol torque. The desired torque is derived in this context from the torque demand and the actual speed; the precontrol torque from a charging strategy of an electric accumulator—such as a battery, for example—assigned to the electric motor and the power demand of a vehicle electrical system.

Example embodiments of the present invention also relate to a method for controlling a hybrid drive, in particular a hybrid drive of a motor vehicle having at least one combustion engine and at least one electric motor as driving motors, whose torques are coupled together to form a total torque. To implement a speed control of the hybrid drive, it is provided for two actuating signals to be specified, to be output to the driving motors, a first actuating signal acting on the electric motor having a higher dynamic response than a second actuating signal acting on the combustion engine. The speed control apportions the torque demand to the driving motor in such a way that the electric motor must meet a short-term torque demand for speed control, while the combustion engine provides a long-term, but precise feedback control of a speed difference ascertained in the speed comparison as a system deviation. This method renders possible a high-quality speed control, the need for maintaining a rapidly retrievable torque reserve at the combustion engine being avoided or minimized.

It is also provided for the first actuating signal and the second actuating signal to be generated from a comparison between an actual speed of the hybrid drive and a setpoint speed. In the case of the speed comparison, the speed deviation is determined by forming a difference between the two speeds.

In particular, it is provided that the speed feedback control be completely overridden by a torque control in response to a torque demand. In order that the speed feedback control not "misinterpret" the torque demand as a torque deviation and that it continue to control the speed, the speed feedback control is suppressed (cut out) from the hybrid drive control in response to a torque demand, for example an actuation of an accelerator pedal.

Finally, it is provided that the speed feedback control be overridden by a sampling of the torque demand that freezes a compensatory component for correcting the system deviation in response to the torque demand, to its instantaneous value and that limits a non-compensatory component to the magnitude of the compensatory component with a negative sign. This measure prevents the compensatory component from controlling the actual speed to the setpoint speed over the long term. Limiting the non-compensatory component allows it to merely compensate for the compensatory component and thus ensures that the speed feedback control is cut out.

Example embodiments of the present invention are explained in greater detail with reference to the figures.

DETAILED DESCRIPTION

Figure 1:
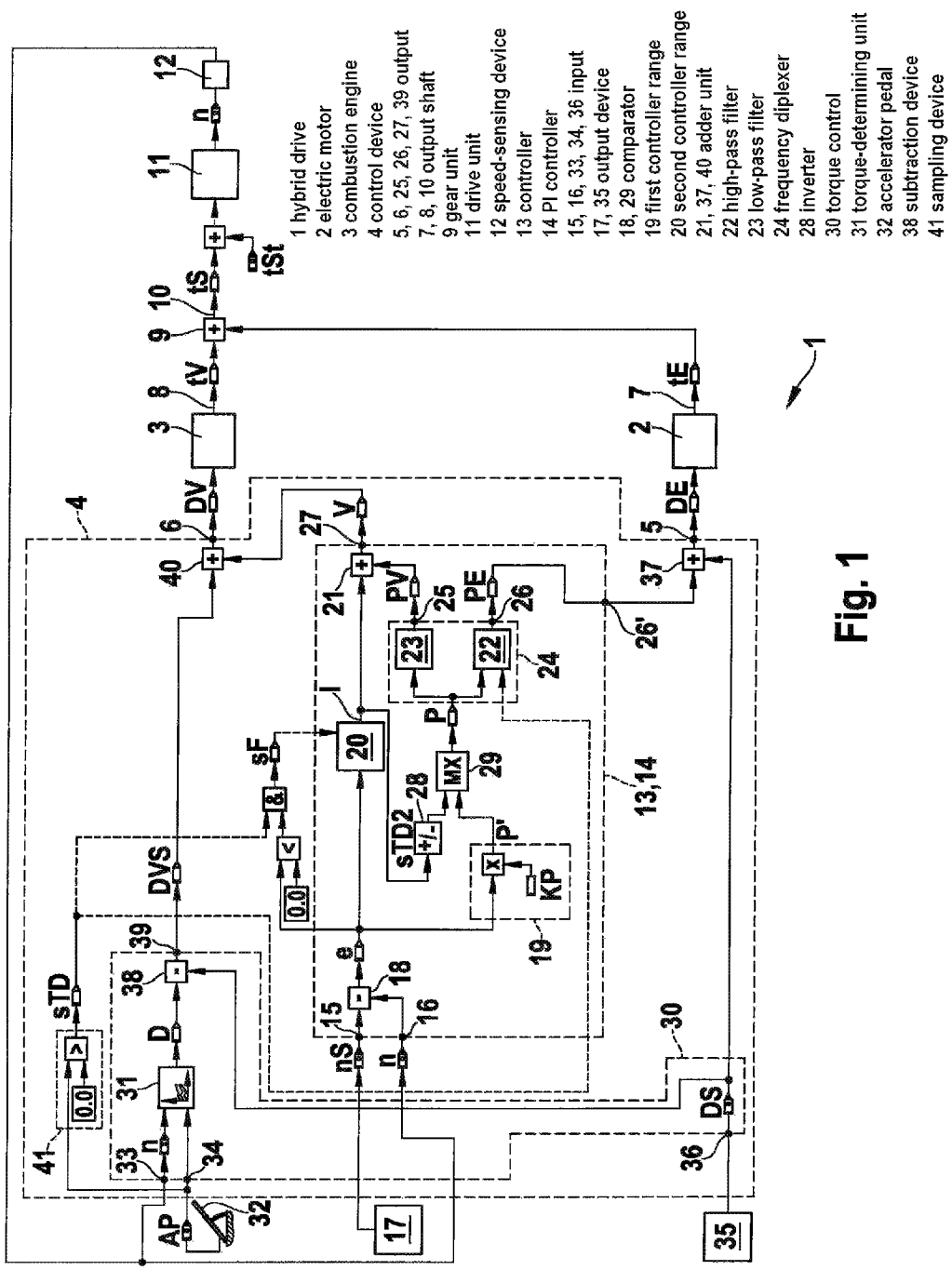
FIG. 1 is a block diagram of a simulation of a hybrid drive having a control device in accordance with an exemplary embodiment.

FIG. 1 shows a block diagram of a simulation of a hybrid drive 1 having two driving motors, the first driving motor being designed as electric motor 2 and the second driving motor as combustion engine 3. Driving motors 2, 3 are driven by a control device 4 which, via an output 5, outputs a first actuating signal DE to electric motor 2 and, via output 6, outputs a second actuating signal DV to combustion engine 3. Driving motors 2, 3 each have an output shaft 7, 8, output shaft 8 of combustion engine 3 and output shaft 7 of electric motor 2 being coupled to one another via a gear unit 9. In this context, added together, electric motor torque tE and combustion engine torque tV form an output torque tS of hybrid drive 1. Connected to gear unit 9 is a common output shaft 10 of driving motors 2, 3 of hybrid drive 1. Output shaft 10 is connected to a mechanical drive unit 11 which is composed, for example, of a differential gear and the driven wheels of a motor vehicle. At mechanical drive unit 11, an actual speed n results—for example at output shaft 10—which is recorded by a speed-sensing device 12. Disturbance torques tSt may act on common output shaft 10—for example via a component of drive unit 11. Control device 4 has a controller 13 which is designed as a PI controller 14. Controller 13 has two inputs 15, 16, input 15 communicating with an output device 17 for outputting a setpoint speed nS, and input 16 communicating with speed-sensing device 12. In controller 13, inputs 15, 16 communicate with a comparator 18 which ascertains a speed difference e between setpoint speed nS and actual speed n. Controller 13 designed as PI controller 14 has a first controller range 19 in which proportional component P' of the feedback control is determined. To this end, speed difference e is output from the first controller range after being multiplied by a prefactor KP. Connected in parallel to first controller range 19 is a second controller range 20, which, from speed difference e, determines an integral component I of speed difference e. Integral component I is branched and, in the first branch, is output to an adder unit 21 of controller 13. In the second branch, an inverter 28 inverts the sign of integral component I, and negative integral component −I is subsequently compared by a comparator 29 to proportional component P'. The comparator subsequently outputs higher value (P' or −I) as proportional component P via a frequency duplexer 24 composed of a high-pass filter 22 and a low-pass filter 23 to outputs 25, 26 thereof. At output 25 of low-pass filter 23, a low-frequency component PV of proportional component P is output via output 26' of controller 13, and, at output 26 of high-pass filter 22, a high-frequency component PE of proportional component P is output. The low-frequency component of proportional component P and integral component I are summed in adder unit 21 and output via output 27 of controller 13 as a second output signal V. In this context, low-frequency component PV of proportional component P determines the non-compensatory component of second actuating signal DV; integral component I determines the compensatory component of second actuating signal DV; and high-frequency component PE of proportional component P determines first actuating signal DE.

In addition to controller 13, control device 4 also has a torque control 30, which, together with a torque-determining unit 31, determines a driver-input torque signal D from a position AP of accelerator pedal 32 and actual speed n of speed-sensing device 12. In this context, torque-determining unit 31 communicates via an input 33 with speed-sensing device 12 and via input 34 with accelerator pedal 32. Via input 36, an output device 35 outputs a precontrol torque signal DS as a function of a charging strategy that is transmitted together with high-frequency component PE of proportional component P of controller 13 via an adder unit 37 to output 5 of control device 4. A subtraction device 38 compares driver-input torque signal D to precontrol torque signal DS and, at output 39, outputs a torque-differential signal DVS, DVS being=D−DS. This torque-differential signal DVS is summed with output signal V of controller 13 in an adder unit 40 of control device 4 and output as second actuating signal DV via output 6 of control device 4 to combustion engine 3. A sampling device 41 samples position AP of accelerator pedal 32 and, in response to actuation of accelerator pedal 32 by the driver, transmits a control signal sTD. If, at the same time, system deviation e is negative and actual speed n is thus above setpoint speed nS, a control signal sF is transmitted to second controller range 20 to freeze integral component I. Element 29 passes on the larger value of proportional component P' and integral component I, which is provided with a negative sign from inverter 28, and thereby ensures that proportional component P is limited.

In the context of simulating hybrid drive 1, signals DE, DV, P, I, PV, PE, V, DS, D and DVS of the control device are considered as equivalent torques tDE, tDV, tP, tI, tPV, tPE, tV, tDS, tD and tDVS. In the following, these variables are described as corresponding torques.

The following function of control device 4 is derived: The shared actual speed n of combustion engine 3 and electric motor 2 is controlled by a PI controller 14. It ascertains system deviation e from setpoint speed nS and actual speed n. A charging strategy specifies a precontrol torque tDS for electric motor 2 as a function of the power demand of a vehicle electrical system, precontrol torque tDS being summed with an inverted sign with driver-input torque tD in order to compensate for the load of electric motor 2. A driver-input torque tD is ascertained for output torque tS from the position of accelerator pedal 32 and actual speed n. If accelerator pedal 32 is not depressed, tD is negative, so that a positive integral component tI ensues in the idle condition, thereby compensating for negative driver-input torque tD. Moreover, integral component tI acting on combustion engine 2 provides a quasi steady-state compensation of inaccuracies and disturbances, resulting in a mean value-free proportional component tP. Setpoint torque tDE of electric motor 2 corresponds to precontrol torque tDS on the average over time, so that the power demand of the vehicle electrical system is met.

To simulate the function of control device 4, the dynamic performance of combustion engine 3 is also simulated. The response of combustion-engine setpoint torque tDV to combustion-engine torque tV is approximately simulated by a series connection of a dead-time element having a dead time of 80 ms and a PT1 element having a time constant of 200 ms. In the exemplary embodiment, the ignition timing is not retarded due to efficiency reasons; the response is predefined by the dynamics of the air supply control. The response of electric-motor setpoint torque tDE to electric motor torque tE is approximately modeled by a PT1 element having a time constant of 30 ms.

Proportional component tP is apportioned by frequency duplexer 24 between combustion engine 3 and electric motor 2. Preferably, the transfer functions (LAPLACE transform using LAPLACE variable s) of low-pass filter 23

$$G_{TP}(s) = \frac{tPV(s)}{tP(s)} \tag{1}$$

and of high-pass filter 22

$$G_{HP}(s) = \frac{tPE(s)}{tP(s)} \tag{2}$$

are selected in such a way, that, for entire transfer function $G_g(s)$, it holds approximately that:

$$G_g(s) = G_{TP}(s) \cdot G_v + G_{HP}(s) \cdot G_E(s) \approx 1 \tag{3}$$

In this context, $$G_v(s) = \frac{tV(s)}{tDV(s)} \tag{4}$$

characterizes the transfer function for controlling the torque of combustion engine 3 (air supply dynamics), and $$G_E(s) = \frac{tE(s)}{tDE(s)} \tag{5}$$

characterizes the transfer function for controlling the torque of electric motor 2. Proportional component tP is dynamically apportioned between electric motor 2 and combustion engine 3, the combustion engine having a delayed response due to the air supply dynamics (intake manifold dynamics) and low-pass filter 23. High-pass filter 22 and the rapid response time of electric motor 2 compensate for the delayed action of combustion engine 3. First actuating signal DE ensures that electric motor 2 responds immediately to disturbances and thus renders possible a high control quality. The proportional component of controller 13 is determined with the aid of a gain factor KP.

Low-pass filter 23 is used for damping movements of a throttle valve which constitutes the actuator for the air supply and/or for reducing the dynamics in the air supply of combustion engine 3, thereby potentially making it possible to improve emission behavior. Transfer function (4) for controlling the torque of the combustion engine is largely dependent on the operating point. Thus, it is advantageous to adapt transfer functions (1), (2) of low-pass filter 23 and/or of high-pass filter 22 to the current operating point (speed, load . . . ).

Integral component tl is frozen in response to a driver actuation of accelerator pedal 32, respectively to some other torque demand AP, and in response to a negative system deviation e where actual speed n is higher than setpoint speed nS. Driver-input torque tD increases as a function of the accelerator pedal actuation. Speed n increases in response to increased driver-input torque tD, a decreasing, negative proportional component tP thereby resulting. Low-frequency component tPV of proportional component P likewise becomes negative and, in response to actual speed n increasing in comparison to setpoint speed nS, compensates for frozen integral component tl. Proportional component tP is limited to integral component that is multiplied by −1, thereby avoiding an overcompensation. If actual speed n is higher by a certain difference than setpoint speed nS, the speed feedback control of controller 13 is then completely cut out, thereby resulting in a torque-controlled operation by torque control 30. Given low-pass filter 23 in a steady state, it holds that tPV=tP=−tl and, thus, for second actuating torque tV of controller 13, that tV=0. In this context, input P of high-pass filter 22 assumes the constant value of −tl; given high-pass filter 22 in a steady state, in then holds for first actuating torque tPE of controller 13 that tPE=0.

Upon completion of actuation of accelerator pedal 32, previously frozen integral component tl is released again and decreases. Limiting the I-component prevents an excessive decrease and an excessive "speed undershoot" when entering into the next speed-controlled phase. Given a high actual speed n, a released integral component affects proportional component tP due to its limitation to −tl. Setpoint torque tDE of electric motor 2 is thereby undesirably influenced due to the differentiating action of high-pass filter 22, which may be avoided, for example, by a speed-dependent parameterization of high-pass filter 22.

Figure 2:
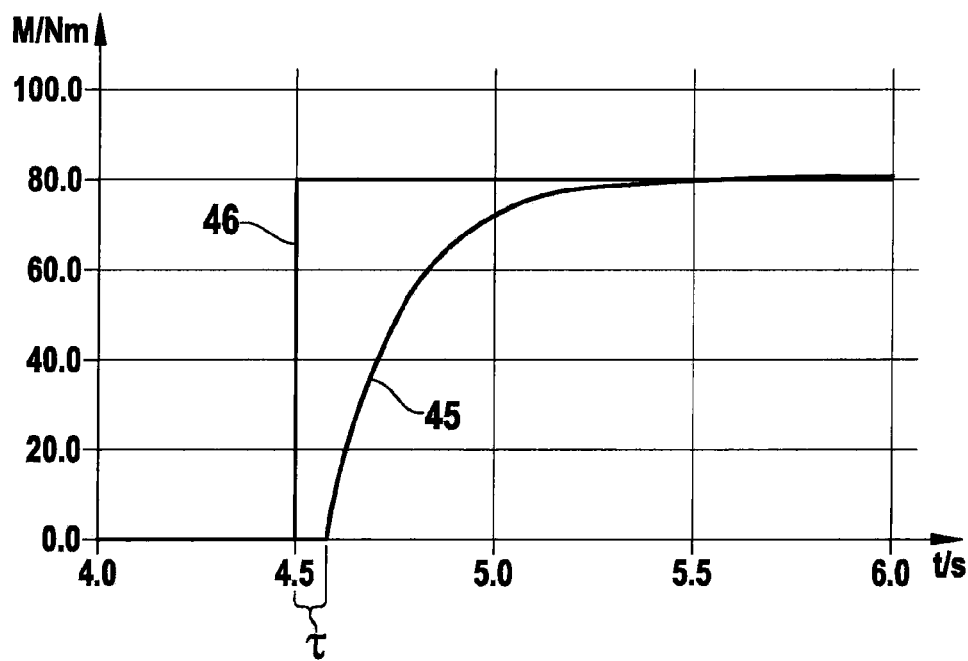
FIG. 2 illustrates the step response of a simulation of the dynamic performance of a combustion engine.

FIG. 2 shows a diagram for characterizing combustion engine 3 where combustion-engine setpoint torque tDV and combustion engine torque tV are plotted over time t. In this context, there is a jump in combustion-engine setpoint torque tDV at instant t=4.5 s. In the case of the simulated response, combustion engine 3 reacts with a delayed rise in combustion-engine torque tV. Therefore, compared to function 46 (tDV), function 45 (tV) exhibits a short dead time and a subsequent rise to a maximum value, as is typical of a PT1 element.

Figure 3:
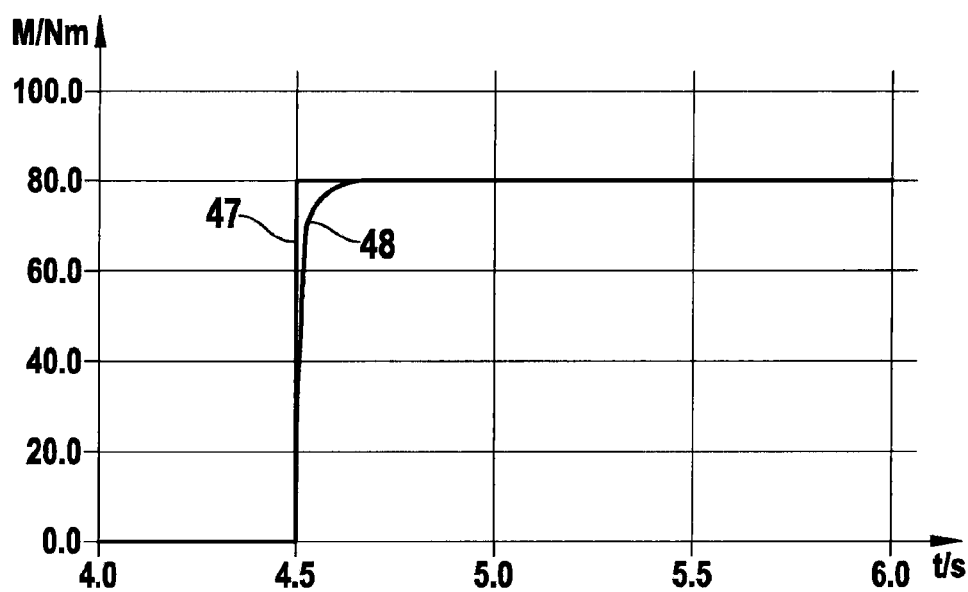
FIG. 3 illustrates the step response of a simulation of the dynamic performance of an electric motor.

FIG. 3 shows the response of electric motor 2 as the step response of electric-motor torque tE to a sudden rise in electric-motor setpoint torque tDE. The sudden rise in electric-motor setpoint torque tDE (function 47) is followed at t=4.5 s by electric-motor actual torque tE without dead time, function 48 (tE) indicating a typical rising characteristic curve of a PT1 element.

Figure 4A:
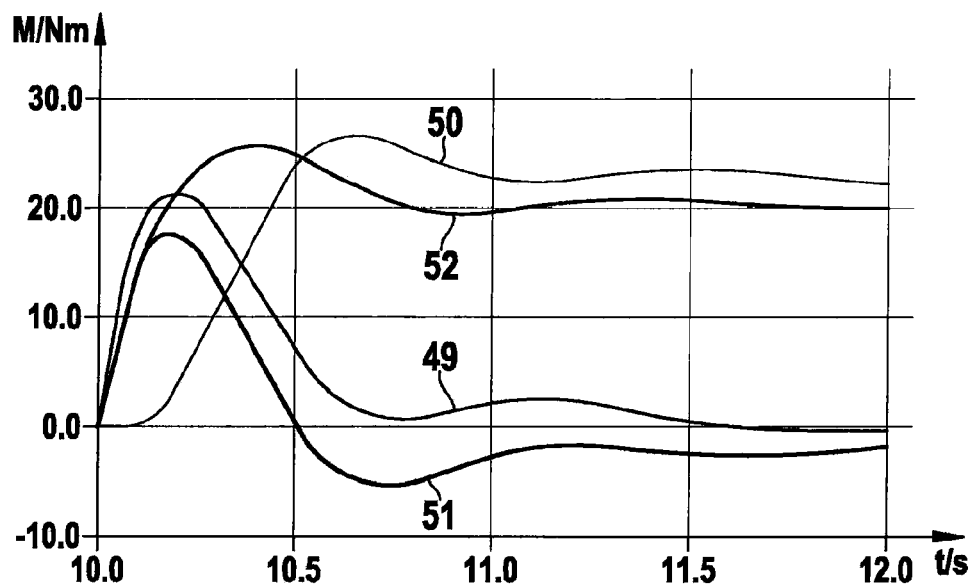
FIGS. 4a and 4b illustrates the reaction of a speed feedback control to an abruptly occurring disturbance torque.
Figure 4B:
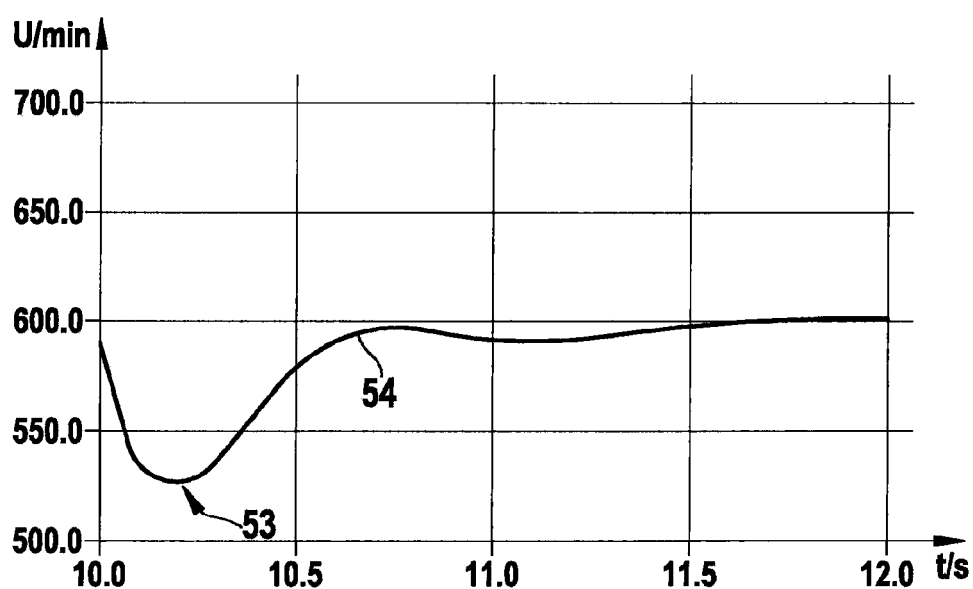

FIG. 4a shows a diagram where the functions of proportional component tP, of combustion-engine torque tV, of electric-motor torque tE and of total torque tS are represented, the time in seconds (s) being plotted on the abscissa, and the torques in newton meters (Nm) being plotted on the ordinate. FIG. 4b shows a diagram illustrating the function of actual speed n as a function of time, the time in seconds being plotted on the abscissa, and the speed in rpm (revolutions per minute) being plotted on the ordinate.

FIGS. 4a and 4b show the reaction of the speed feedback control of controller 13 to a jump of disturbance torque tSt from 0 Nm to 20 Nm at instant t=10 s. In this context, setpoint speed nS=600 rpm. Accelerator pedal 32 is not actuated. Proportional component tP (function 49) reacts immediately to the deviation of actual speed n (function 54) from setpoint speed nS. Combustion-engine torque tV (function 50) has only a delayed reaction due to low-pass filter 23 and the air path dynamics of combustion engine 3. Electric-motor torque tE (function 51) compensates for the delayed torque build-up at combustion engine 3, by the action of high-pass filter 22. A comparison of output torque tS (function 52) to proportional component tP (function 49) reveals that, together, combustion engine 3 and electric motor 2 nearly realize proportional component tP, greater deviations thereby occurring at or above t=10.25 s. These deviations are due to integral component tl additionally acting on output torque tS.

Figure 5A:
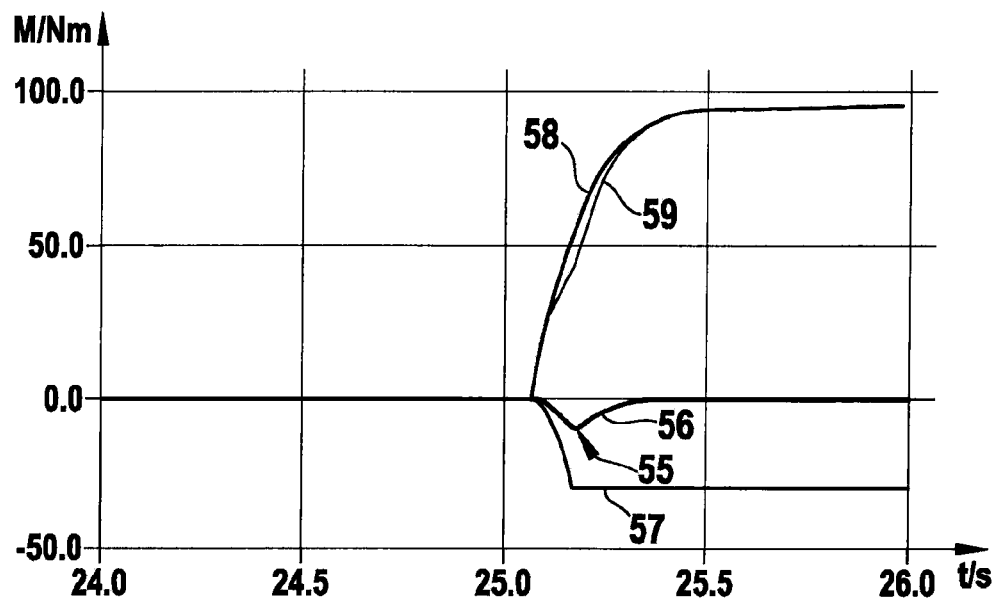
FIGS. 5a and 5b illustrates a transition from the speed-controlled operation to a torque-controlled operation.
Figure 5B:
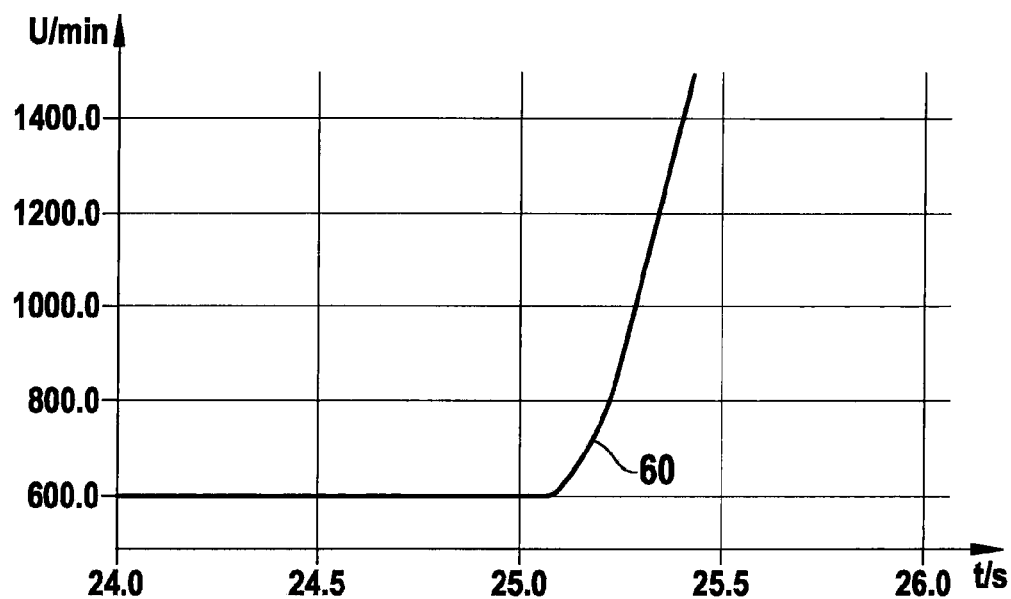

FIG. 5a shows a diagram where the functions of proportional component tP, combustion-engine torque tV, electric-motor actual torque tE and total torque tS are represented, the time being plotted on the abscissa, and the torques being plotted on the ordinate. FIG. 5b shows a diagram illustrating the function of actual speed n, the time in seconds being plotted on the abscissa, and the speed in rpm (revolutions per minute) being plotted on the ordinate.

FIGS. 5a and 5b show exemplarily a transition from a speed-controlled operation to a torque-controlled operation upon actuation of accelerator pedal 32 by superseding controller 13. Undershoot 55 in the curve of function 56 of electric-motor torque tE is derived from the falling region of function 57 of proportional component tP. To limit undershoot 55, parameters of high-pass filter 22 are changed as a function of the position of accelerator pedal 32, respectively of the output quantity of sampling device 41. Function 58 shows the typical rising characteristic of combustion-engine torque tV in response to an increase in driver-input torque tD. In contrast, output torque tS (function 59) shows a brief delay which originates from undershoot 55. Function 60 of FIG. 5b shows the resulting increase in actual speed n.

Figure 6:
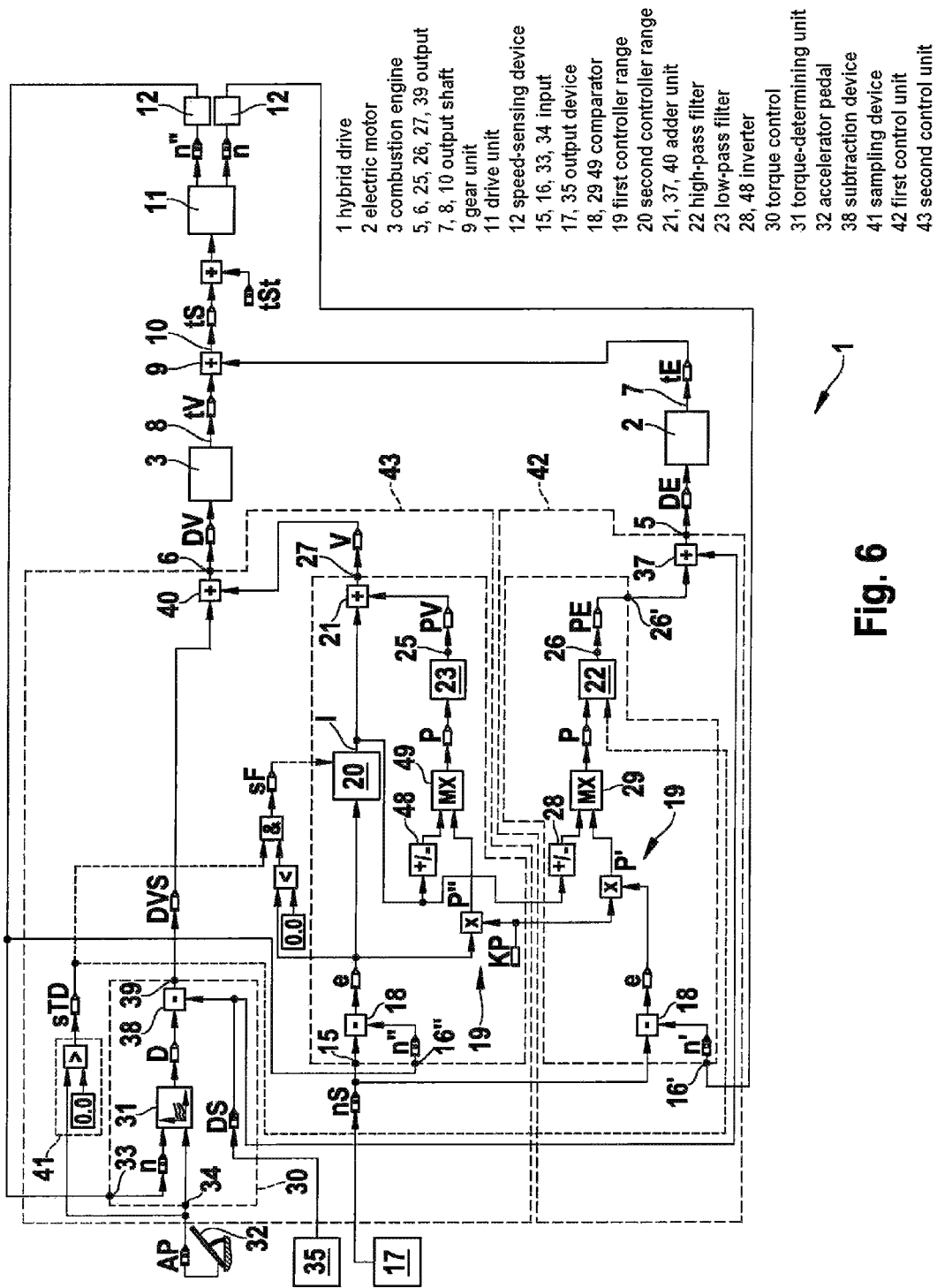
FIG. 6 is a block diagram of a simulation of a hybrid drive having a control device which is apportioned between the control units of the combustion engine and of the electric motor.

Present-day control units function in accordance with the sampling control principle based on a time-synchronous or torque-synchronous calculation cycle of the control algorithms. The calculation cycles of various control units are typically not synchronized to one another, and the control units communicate with one another over a bus system. Both lead to time delays in the data exchange process. Time delays, respectively dead times reduce the possible gain in the context of the speed control, given a constant stability reserve. Consequently, the control quality is limited in response to the closing of a control loop over a bus system. FIG. 6 shows a modified exemplary embodiment of control device 4 of hybrid drive 1 that overcomes this disadvantage.

FIG. 6 corresponds essentially to FIG. 1, so that only the differences between them are discussed here. In this context, the controller is apportioned between a first control unit 42 of electric motor 2 and a second control unit 43 of combustion engine 3 in such a way that the first actuating signal is generated by a speed comparison of a comparator 18 in first control unit 42 and the second actuating signal by the speed comparison of a comparator 18 in second control unit 43. To this end, actual speed n in first control unit 42 is determined by speed n' of electric motor 2 and, in second control unit 43, by speed n" of combustion engine 3. Within the bounds of measurement uncertainty, these quantities n, n', n" are equal in magnitude. Thus, the two proportional components tP' and tP" are approximately equal in magnitude in both control units 42, 43. Both proportional components are limited to the negative value of integral component tl (to −tl), thereby making it possible for the mechanism described above to effect a transition from the speed-controlled operation to the torque-controlled operation even when controller 13 is apportioned between first control unit 42 and second control unit 43. In this context, inverter 48 and comparator 49 of control unit 43 correspond to inverter 28 and comparator 29 of control unit 42. The less time-critical variables, such as precontrol torque tDS for electric motor 2, setpoint speed nS, gain factor KP, integral component tl, sampling variable sTD, as well as other optional parameters are transmitted via a bus system. The actual control loops (feedback of speeds n' and n") are not closed over the bus system, so that dead times are avoided. A high control quality is thereby made possible.

What is claimed is:

1. A control device for a hybrid drive including at least one combustion engine and at least one electric motor as driving motors, whose torques are coupled together to form a total torque, comprising:
    a controller adapted to generate an actuating signal for controlling a speed of each of the driving motors, a first actuating signal acting on the electric motor having a higher dynamic response than a second actuating signal acting on the combustion engine; and
    a sampling device adapted to sample a torque demand which, in response to the torque demand, freezes a compensatory component to an instantaneous value and limits a non-compensatory component to a magnitude of the compensatory component with a negative sign.

2. The control device according to claim 1, wherein the hybrid drive is arranged as a hybrid drive of a motor vehicle.

3. The control device according to claim 1, wherein the controller is adapted to generate the first actuating signal and the second actuating signal from a comparison between an actual speed of the hybrid drive and a setpoint speed.

4. The control device according to claim 1, wherein the first actuating signal is non compensatory and the second actuating signal includes a compensatory component and a non compensatory component.

5. The control device according to claim 1, wherein the controller is at least one of (a) a PI controller and (b) a PID controller.

6. The control device according to claim 1, wherein an integral component of a control output signal is compensatory and at least one of (a) a proportional component of the control output signal and (b) a differential component of the control output signal is non-compensatory.

7. The control device according to claim 6, wherein a frequency diplexer is connected in outgoing circuit to the controller to separate at least one of (a) the proportional component and (b) the differential component of the controller output signal into the first actuating signal and the non-compensatory component of the second actuating signal, the first actuating signal having a higher dynamic response than the non-compensatory component of the second actuating signal.

8. The control device according to claim 1, wherein the controller is apportioned between a first control unit of the electric motor and a second control unit of the combustion engine, the first actuating signal being generated by a speed comparison in the first control unit and the second actuating signal by a speed comparison in the second control unit.

9. The control device according to claim 1, further comprising a torque control adapted to control one of the two driving motors as a function of a difference between a desired torque and a precontrol torque.

10. A method for controlling a hybrid drive including a combustion engine and at least one electric motor as driving motors, whose torques are coupled together to form one torque, comprising:
    for implementing a speed control of the hybrid drive, two actuating signals are specified, to be output to the driving motors, a first actuating signal acting on the electric motor having a higher dynamic response than a second actuating signal acting on the combustion engine;
    wherein a speed feedback control is overridden by a sampling of a torque demand which freezes a compensatory component for correcting a system deviation in response to the torque demand, to its instantaneous value and that limits a non-compensatory component to a magnitude of the compensatory component with a negative sign.

11. The method according to claim 10, wherein the hybrid drive is arranged as a hybrid drive of a motor vehicle.

12. The method according to claim 10, wherein the first actuating signal and the second actuating signal are generated from a comparison between an actual speed of the hybrid drive and a setpoint speed.

13. The method according to claim 10, wherein a speed feedback control is completely overridden by a torque control in response to a torque demand.

* * * * *

UNITED STATES PATENT AND TRADEMARK OFFICE
CERTIFICATE OF CORRECTION

PATENT NO. : 8,532,852 B2  
APPLICATION NO. : 12/304961  
DATED : September 10, 2013  
INVENTOR(S) : Jens-Werner Falkenstein It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1052 days.

Signed and Sealed this
Fifteenth Day of September, 2015

Michelle K. Lee
*Director of the United States Patent and Trademark Office*